United States Patent
Roth et al.

(10) Patent No.: US 10,047,692 B2
(45) Date of Patent: Aug. 14, 2018

(54) GDCI COLD START MISFIRE PREVENTION

(71) Applicant: DELPHI TECHNOLOGIES IP LIMITED, St. Michael (BB)

(72) Inventors: Gregory T. Roth, Davison, MI (US); Gary C. Fulks, Fort Myers, FL (US); Andrew Fedewa, Clarkston, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 151 days.

(21) Appl. No.: 14/958,976

(22) Filed: Dec. 4, 2015

(65) Prior Publication Data
US 2017/0159594 A1 Jun. 8, 2017

(51) Int. Cl.
- G01M 15/08 (2006.01)
- G01M 15/11 (2006.01)
- F02D 35/02 (2006.01)
- F02D 41/14 (2006.01)
- F02D 41/00 (2006.01)

(52) U.S. Cl.
CPC ....... *F02D 41/1402* (2013.01); *F02D 35/023* (2013.01); *F02D 35/025* (2013.01); *F02D 35/027* (2013.01); *F02D 35/028* (2013.01); *F02D 41/0087* (2013.01); *G01M 15/08* (2013.01); *G01M 15/11* (2013.01); *F02D 2041/1409* (2013.01); *F02D 2041/1412* (2013.01)

(58) Field of Classification Search
CPC .................. G01M 15/08; G01M 15/11; F02D 35/021–35/028; F02D 2200/1015; F02D 2041/1412; F02P 2017/125; F02P 2017/126
USPC ......... 123/295, 305, 406.14, 406.27–406.29, 123/406.41–406.43, 435; 73/114.02, 73/114.08, 114.09
See application file for complete search history.

(56) References Cited

U.S. PATENT DOCUMENTS

| | | | | |
|---|---|---|---|---|
| 5,093,792 | A * | 3/1992 | Taki | F02D 35/023 701/111 |
| 7,210,457 | B2 * | 5/2007 | Kuzuyama | F02D 37/02 123/305 |
| 2006/0272616 | A1 * | 12/2006 | Kuzuyama | F02D 37/02 123/435 |
| 2008/0041339 | A1 * | 2/2008 | Nishikiori | F02D 13/0261 123/406.48 |
| 2011/0100323 | A1 * | 5/2011 | Bradley | F02B 1/12 123/304 |
| 2011/0270505 | A1 * | 11/2011 | Chaturvedi | F02D 41/1498 701/102 |
| 2014/0311450 | A1 * | 10/2014 | Minami | F02P 5/045 123/406.46 |
| 2017/0122246 | A1 * | 5/2017 | Ottikkutti | F02D 41/402 |

\* cited by examiner

*Primary Examiner* — Erick Solis
(74) *Attorney, Agent, or Firm* — Joshua M. Haines

(57) ABSTRACT

A GDCI engine control system determines if in-cylinder conditions are sufficient to achieve combustion in a given cylinder or if a misfire is likely. Fuel is delivered to that cylinder if combustion is probable, but fuel is disabled to that cylinder if a misfire is probable.

17 Claims, 3 Drawing Sheets

GDCI COLD START MISFIRE PREVENTION

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND

This disclosure relates to an engine control system used to prevent a misfire in a Gasoline Direct-Injection Compression-Ignition (GDCI) engine.

Engine control systems for conventional spark ignition internal combustion engines use algorithms that prioritize fast synchronization of the engine controller with the crankshaft and camshaft rotation. Doing so enables fuel to be delivered to the appropriate cylinders as quickly as possible during a cold start.

The primary motivation for delivering fuel quickly during a cold start is to minimize the start time. Such methods can result in quick engine starts but may come at the expense of high emissions. Since the only function of the algorithms is to deliver the fuel when synchronization is complete, rather than deliver fuel when in-cylinder conditions are appropriate for combustion it is possible to inject fuel into a cylinder which will misfire, which, of course, will result in high hydrocarbon emissions. This risk has proven to be relatively low for conventional spark ignition engines.

SUMMARY

In one exemplary embodiment, an engine control system includes a combustion chamber that is configured to provide an in-cylinder combustion condition. A component is configured to contribute to a combustion event in the combustion chamber. At least one sensor is configured to detect the in-cylinder combustion condition. A controller is in communication with the sensor and is configured to predict a misfire in the combustion chamber in response to the detected in-cylinder combustion condition. The controller is in communication with the component and is configured to command the component to skip the contribution to the combustion event in response to the predicted misfire.

In a further embodiment of the above, the component is a fuel injector that is in fluid communication with the combustion chamber. The fuel injector is configured to deliver fuel to the combustion chamber to contribute to the combustion event when autoignition is probable. The controller is configured to prevent the fuel injector from delivering the fuel in response to the predicted misfire. The misfire is probable when autoignition is improbable.

In a further embodiment of the above, the in-cylinder combustion condition is based upon a charge property that includes at least one of a combustion chamber pressure, a combustion chamber temperature and a combustion chamber oxygen content as a proxy for inert exhaust gas mass fraction. At least one sensor is configured to detect a parameter associated with the at least one of the combustion chamber pressure, the combustion chamber temperature and the combustion chamber oxygen content.

In a further embodiment of the above, the charge property is used to predict an autoignition for an engine cycle.

In a further embodiment of the above, an engine cycle corresponds to a piston during a compression stroke.

In a further embodiment of the above, the controller selects a desired fuel mass and timing for a target crank angle to predict autoignition for the engine cycle.

In a further embodiment of the above, a knock integral is used to predict autoignition for the engine cycle.

In a further embodiment of the above, the controller is configured to determine whether autoignition is predicted to occur before a start of combustion limit.

In a further embodiment of the above, the start of combustion limit corresponds to +/−10° of top dead center of a piston compression stroke.

In a further embodiment of the above, predicted autoignition corresponds to a knock integral equal to 1.

In a further embodiment of the above, the controller is configured to predict another autoignition for the engine cycle if autoignition is not predicted to occur before the start of combustion limit and sufficient time remains before a next engine cycle.

In a further embodiment of the above, the desired fuel mass and timing is stored in a memory along with the corresponding in-cylinder conditions when autoignition is predicted.

In another exemplary embodiment, a method of controlling an internal combustion engine includes the steps of predicting a misfire in a combustion chamber and skipping an initiation of a combustion event in the combustion chamber until the misfire is no longer predicted.

In a further embodiment of the above, the predicting step includes selecting a desired fuel mass and timing for the combustion event based upon in-cylinder conditions.

In a further embodiment of the above, the predicting step includes predicting autoignition of fuel within the combustion chamber.

In a further embodiment of the above, the predicting step includes determining a knock integral based upon a crank angle and fuel ignition delay during an engine cycle.

In a further embodiment of the above, the predicting step occurs multiple times for an engine cycle.

In a further embodiment of the above, the predicting step is performed during an engine cold start.

In a further embodiment of the above, the skipping step includes disabling fuel flow to the combustion chamber.

In another exemplary embodiment, an internal combustion engine control system includes a controller configured to predict a misfire in a combustion chamber and disable a fuel flow to the combustion chamber in response to the predicted misfire.

In a further embodiment of the above, the controller includes a fuel injector driver. The fuel injector driver is configured to disable a signal to a fuel injector in response to the predicted misfire.

In a further embodiment of the above, the controller is configured to determine the misfire based upon a knock integral.

In a further embodiment of the above, the controller calculates the knock integral for a given engine cycle based upon pressure, temperature, and oxygen concentration within the combustion chamber, and a crank angle, engine speed and fuel ignition delay.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
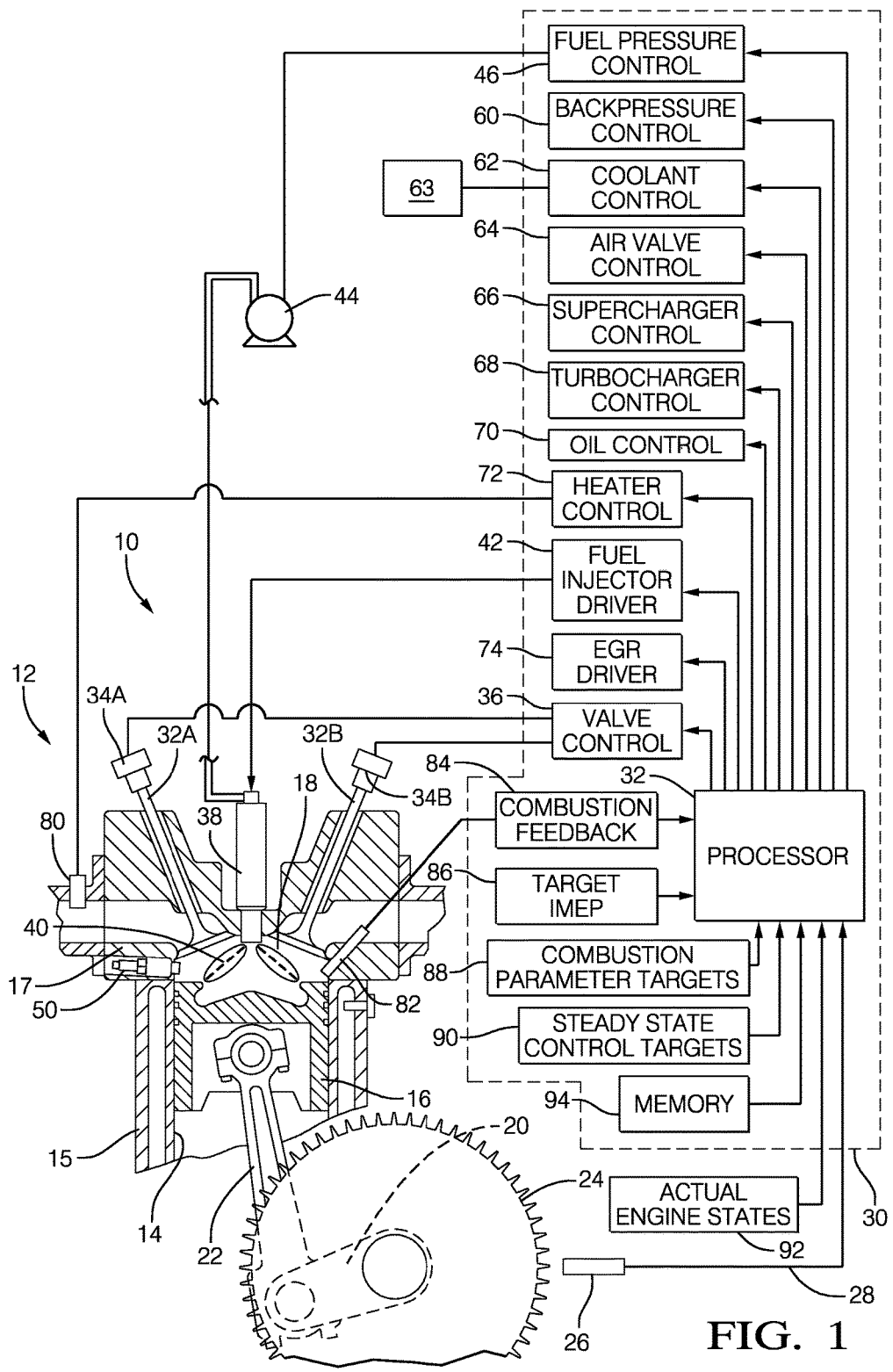
FIG. 1 is a schematic view of an embodiment of an engine control system suitable for controlling a GDCI engine.

FIG. 1 illustrates a non-limiting embodiment of an engine control system 10 suitable for controlling a Gasoline Direct-Injection Compression-Ignition (GDCI) internal combustion engine 12 for use in a vehicle, for example. GDCI differs from a Homogeneous Charge Compression Ignition (HCCI) in that the fuel/air mixture is intentionally non-homogeneous at the point of start of combustion (SOC) and employs a controlled distributed-equivalence-ratio mixture at SOC. That is, the fuel is stratified, providing discrete regions of equivalence-ratio, as disclosed in United States Publication No. 2013/0213349, which is incorporated herein by reference in its entirety. This distributed-equivalence ratio feature allows control of the fuel heat release timing and heat release rate as the combustion process progresses throughout the combustion chamber. Controllability of the heat release timing and rate allows GDCI to operate over essentially the entire speed and load range of the engine, which in turn may alleviate the need for mode switching and the associated efficiency losses. Although the exemplary embodiment relates to a GDCI engine, it should be understood that the disclosed engine control system and method can also be used for compression ignition diesel or HCCI engines.

While only a single cylinder is shown in FIG. 1, it will be appreciated that the disclosed system and method may be practiced independently on each cylinder of a multi-cylinder engine or commonly across multiple cylinders. The engine 12 is illustrated as having a cylinder bore 14 containing a piston 16, wherein the region above the piston 16 defines a combustion chamber 18. Linear movement of the piston 16 within the cylinder bore 14 rotationally drives a crankshaft 20 via a connecting rod 22.

During engine operation it is desirable to determine the position of the piston 16 throughout its linear travel within the cylinder bore 14, for example, from bottom dead center (BDC) to top dead center (TDC). To this end, the system 10 may include a toothed crank wheel 24 and a crank sensor 26 positioned proximate to the crank wheel 24 to sense rotational movement of the crank wheel teeth. The crank sensor 26 outputs a crank signal 28 to a controller 30 indicative of a crank angle θ, which corresponds to the linear position of the piston 16, and a crank speed N.

The controller 30, such as an engine control module (ECM), may include a processor 32 or other control circuitry as should be evident to those in the art. The controller 30 and/or processor 32 may include memory 94, including non-volatile memory, such as electrically erasable programmable read-only memory (EEPROM) for storing one or more routines, thresholds and captured data. The one or more routines may be executed by the processor 32 to perform steps for determining a prior engine control parameter and scheduling a future engine control signal such that a future engine control parameter corresponds to a desired engine control parameter. FIG. 1 illustrates the processor 32 and other functional blocks as being part of the controller 30. However, it will be appreciated that it is not required that the processor 32 and other functional blocks be assembled within a single housing, and that they may be distributed about the engine 12 or vehicle. Signals to and from the controller 30 are indicated by solid arrowed lines in the figures.

One or more intake valve 32A and exhaust valve 32B are driven by one or more camshafts to regulate the flow of air into and exhaust from the combustion chamber 18. In one embodiment, a cam phaser 34A, 34B is respectively coupled to each of the intake valve 32A and the exhaust valve 32B, to provide further control of lift and/or duration of the valves beyond that provided by the camshaft profile. The cam phasers 34A, 34B are controlled by a signal from a valve control 36.

A fuel injector 38 is configured to dispense fuel 40 in accordance with an injector control signal from by an injector driver 42. Example fuels include naphtha, kerosene, diesel, or gasoline; however, other fuels may be used. The fuel injector 30 controls delivery of fuel 40 to the combustion chamber 18 from a fuel pump 44 and a fuel spill valve, for example, controlled by a fuel pressure control 46.

Desired operation of a GDCI engine relies upon achieving a distribution of desired fuel/air ratio, or equivalence ratio φ, unlike typical internal combustion engines. Unlike typical internal combustion engines, a GDCI engine controls in-cylinder conditions to achieve autoignition of the fuel, rather than relying on external ignition sources such as a spark plug or a glow plug. Unlike typical diesel engines which utilize locally rich combustion via a diffusion flame, GDCI utilizes a progressive autoignition process of a distribution of equivalence ratios varying from lean to slightly rich at the moment of start of combustion. The fuel injection profile of a GDCI engine includes one or more injection events intended to deliver partially premixed fuel to the combustion chamber 18, rather than a homogenous air/fuel mixture as is done in Homogeneous Charge Compression Ignition (HCCI) engines, for example.

Controllable aspects of the fuel injection profile may include how quickly or slowly the fuel injector 38 is turned on and/or turned off, a fuel rate of fuel 40 dispensed by the fuel injector 38 while the fuel injector 38 is on, the initiation timing and duration of one or more fuel injections as a function of engine crank angle θ, the number of fuel injections dispensed to achieve a combustion event, and/or the pressure at which fuel is supplied to the fuel injector 38 by the fuel pump 44. Varying one or more of these aspects of the fuel injection profile may be effective to control autoignition. The engine 12 may also be equipped with an ignition source such as a spark plug 50 to assist with initial engine starting, if desired.

In order to achieve autoignition of the air/fuel mixture over essentially the entire speed-load range of the engine while achieving exceptional fuel consumption, noise, and emissions results, a multiple late-injection, partially mixed-mixture, low-temperature combustion process is used. Fuel 40 is injected by the fuel injector 38, where the fuel injector is fed by a fuel rail at a pressure in the range of 100 to 500 bar, late on the compression stroke using a number of distinct injection events to produce a certain state of controlled air/fuel mixture in the combustion chamber 18. The state of stratification in the combustion chamber 18 along with cylinder air charge properties controls the time at which autoignition occurs and the rate at which it proceeds. Depending on engine speed and load, single-injection, double-injection, triple-injection, quadruple-injection, quintuple-injection, or higher order strategies may be used. Fuel may be injected late on the compression stroke and generally in the range of 100 crank angle degrees before top dead center to 10 crank angle degrees after top dead center under most operating conditions, but other conditions may require injection timing outside this range.

The engine control system 10 includes one or more engine control devices operable to control an engine control parameter in response to an engine control signal, wherein the engine control parameter influences when autoignition initiates and the rate at which autoignition propagates through the combustion chamber 18. Aspects of the engine control system 10 will be more fully understood with reference to the air and exhaust gas paths of the engine 12, shown in FIG. 2.

Figure 2:
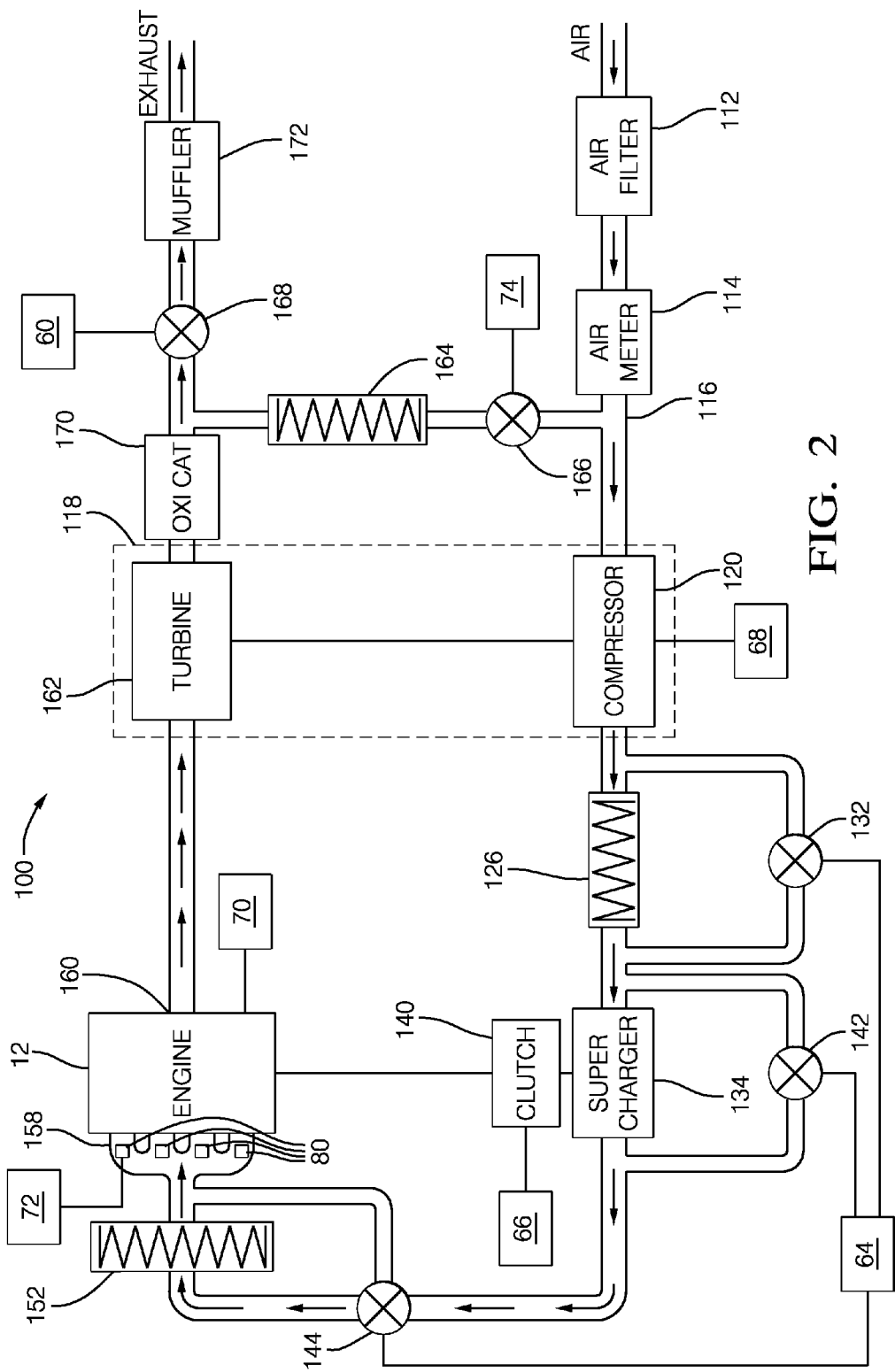
FIG. 2 is a schematic view of an embodiment of air and exhaust gas paths of the engine shown in FIG. 1.

FIG. 2 is a schematic view of a non-limiting embodiment of a gas path system 100 for providing air to and expelling exhaust from the combustion chamber 18 of the engine 12 in FIG. 1. More or fewer components than shown may be used, and the gas paths may be configured differently than illustrated.

Referring to FIG. 2, air passes through an air filter 112 and a mass airflow sensor (air meter) 114 into an air duct 116. The air duct 116 channels air into a compressor 120 of a turbocharger 118 in communication with a turbocharger control 68 (FIG. 1). Air is then channeled from the compressor 120 into a first charge air cooler 126. The first charge air cooler 126 is connected to a supercharger 134. A first charge air cooler bypass valve 132 is connected between an air inlet and an air outlet of the first charge air cooler 126 to selectively divert air around the first charge air cooler 126.

Air from first charge air cooler 126 is channeled to the air inlet 136 of a supercharger 134, which is driven by the engine 12 through a controllable clutch 140 in communication with a supercharger control 66 (FIG. 1). A controllable supercharger bypass valve 142 allows air to bypass the supercharger 134. The air from the supercharger 134 and/or from the supercharger bypass valve 142 is channeled to a second charge air cooler bypass valve 144. The second charge air cooler bypass valve 144 selectively provides air to a second charge air cooler 152 and/or an air intake manifold 158 of the engine 12. An air valve control 64 (FIG. 1) is in communication with the first charge air cooler bypass valve 132, supercharger bypass valve 142 and second charge air cooler bypass valve 144 to coordinate the flow of air therethrough.

An air intake heater 80 is arranged in each of an intake runner of the air intake manifold 158. Each air intake heater 80 is in communication with a heater control 72 (FIG. 1) and is configured to heat air at the intake port of a corresponding cylinder 14 of the engine 12. Alternatively, a single heat source may be disposed in the air intake manifold 158 so as to heat air supplied to all of the intake ports of the engine 12.

With continuing reference to FIG. 2, following a combustion event, exhaust gas exits one or more exhaust ports 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 166 that is controlled by an EGR driver 74 (FIG. 1), to be reintroduced into the intake air stream at air duct 116. The remainder of the exhaust gas that is not recirculated through the EGR system passes through a backpressure valve 168, which is in communication with a backpressure control 60 (FIG. 1), and a muffler 172, to be exhausted out a tail pipe.

It will be appreciated from the foregoing description of FIG. 2 that some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In one embodiment, the other heat transfer medium is a liquid coolant provided in coolant system 63 (FIG. 1), which includes a high temperature cooling loop and/or a low temperature cooling loop regulated by a coolant control 62 (FIG. 1). In an alternate embodiment, a gaseous coolant may be used in lieu of a liquid coolant. An oil control 70 (FIGS. 1 and 2) may also be used to regulate the flow of oil, and therefore the oil temperature, through the engine 12.

Returning to FIG. 1, the engine control system 10 includes a combustion sensing device 82, such as a pressure sensor, arranged in the combustion chamber 18. The combustion sensing device 82 provides a signal to a combustion feedback module 84 that is indicative of in-cylinder conditions within the combustion chamber 18, such combustion characteristics and/or pre-combustion conditions. Another example combustion sensing device 82 detects heat release. Other devices that may be useful for indicating some aspect of the combustion process are a knock sensor or an ion sensor. The combustion detection device 82 may be any one of the exemplary sensors, other suitable sensor, or a combination of two or more sensors arranged to provide an indication of in-cylinder conditions.

The controller 30 has other modules relating to desired engine operation, including target Indicated Mean Effective Pressure (IMEP) 86, combustion parameter targets 88, and steady state control targets 90. Combustion parameter targets 88 may correspond to empirically determined values relating to the combustion process within the combustion chamber 18 during various engine operating conditions. Although not shown, the engine control system 10 may include additional sensors or estimators to determine temperature and/or pressure and/or oxygen concentration (for example, in-cylinder conditions within the combustion chamber 18) and/or humidity at locations within the air intake system and/or the engine exhaust system, which may be provided as actual engine states 92.

The controller 30 utilizes predictive models to determine if the in-cylinder conditions are sufficient to achieve combustion (autoignition of fuel) in a given cylinder, for example, during a cold start. Fuel is then delivered to that cylinder if combustion is probable, but fuel will not be delivered if a misfire is probable.

The GDCI engine control system may use one or more predictive models to predict autoignition, for example a knock-integral-based start-of-combustion (SOC) estimator. In addition, combustion feedback data that is generated during engine development can be used to create a learning algorithm to characterize individual cylinder behavior, changes in behavior over time, and fuel property changes that affect combustion and cold start.

An exemplary simplified knock integral is provided below as Equation 1.

$$\text{knock integral} = \int_{\theta_{initial}}^{\theta_{SOC}} \frac{1}{\omega \tau} d\theta, \quad \text{(Equation 1)}$$

where θ is the crank angle,
ω is the engine speed, and
τ is the ignition delay which is a function of mixture conditions.

A knock integral of 1 or greater is indicative of probable auto-ignition, and a knock integral of less than 1 is indicative of a probable misfire. $\theta_{initial}$ is defined as an initial crank angle where fueling is targeted to begin. $\theta_{SOC}$ is defined at the crank angle at which the knock integral equals 1. The integration proceeds until the integral equals 1 or until a SOC limit angle is reached. In one example, $\theta_{initial}$ to $\theta_{SOC}$ corresponds to crank angle range of 100° before TDC to 10° after TDC. Fuel ignition delay lookup tables are derived experimentally. One example knock integral relies on estimated charge pressure, temperature and local air fuel ratio and is described in Hillion, M., Chauvin, J. & Petit, N. (2008). *Proceeding from 2008 American Control Conference: Controlling the start of combustion on an HCCI Diesel engine*. Seattle, Wash., which is incorporated herein by reference in its entirety. It should be understood that other knock integrals may be used. See, e.g., Swan, K., Shahbakhti, M., and Koch, C. (2006). Predicting Start of Combustion Using a Modified Knock Integral Method for an HCCI Engine, *SAE Technical Paper* 2006-01-1086, doi: 10.4271/2006-01-1086., which is incorporated herein by reference in its entirety. Furthermore, other algorithms in addition to or instead of a knock integral can be used to determine whether a misfire or autoignition is probable.

Figure 3:
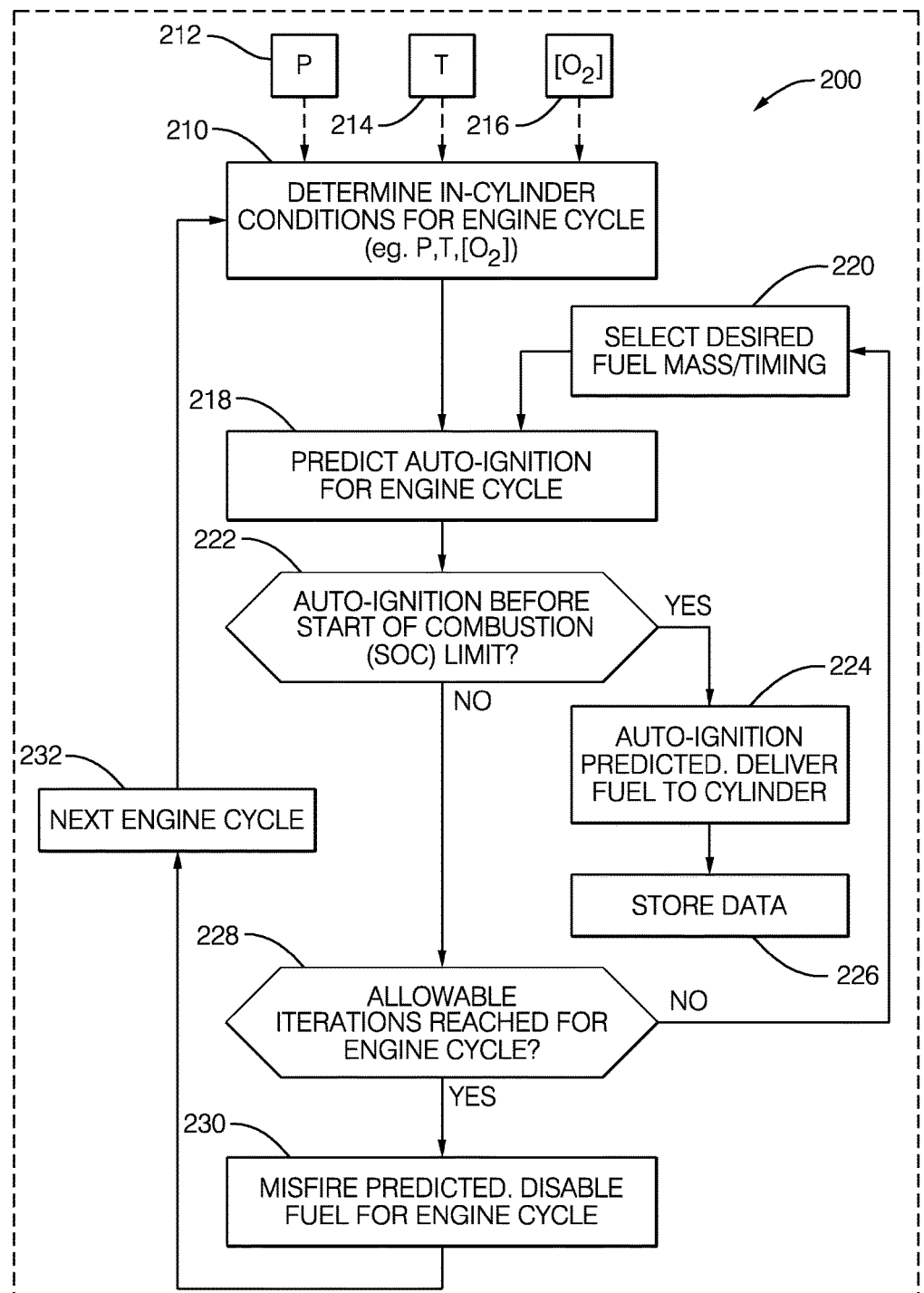
FIG. 3 is a flow chart depicting a method of controlling fuel to the engine with the engine control system.

The controller 30 is in communication with one or more sensors, for example, a pressure sensor of combustion detection device 82, which is configured to detect the in-cylinder conditions of the combustion chamber 18. With reference to the flow chart in FIG. 3, the in-cylinder combustion conditions are determined (block 210) based upon a charge property (for example, P, T, [$O_2$]) that includes at least one of a combustion chamber pressure (block 212), a combustion chamber temperature (block 214) and a combustion chamber oxygen content as a proxy for inert exhaust gas mass fraction (block 215). The combustion chamber temperature and combustion chamber oxygen content are estimated in one example. There is a combination of minimum values of these parameters, which, if not met, will not support robust combustion of a given quantity of fuel. At least one sensor is configured to detect a parameter associated with the at least one of the combustion chamber pressure, the combustion chamber temperature and the combustion chamber oxygen content. These values may be measured directly or inferred based upon other measurements or component operating conditions.

The controller 30 is configured to predict a misfire in the combustion chamber in response to the detected in-cylinder combustion conditions of a given cylinder (block 218) during a given engine cycle corresponding to a piston compression stroke. The controller 30 is in communication with a component, such as the fuel injector 38, and is configured to command the component to skip the contribution to the combustion event in response to the predicted misfire. In one embodiment, the controller 30 disables fuel delivery to the combustion chamber 18 if a misfire is predicted. Conversely, if autoignition is probable (e.g., knock integral=1 or greater), the controller 30 commands the fuel injector 38 to deliver fuel to the combustion chamber 18, which contributes to the combustion event.

The controller 30 predicts misfire, by using the knock integral, for example, based upon a desired fuel mass and timing (block 220) selected for a target fueling crank angle, which corresponds to $\theta_{initial}$, to predict autoignition for the engine cycle. The target fueling crank angle may be selected from the steady state targets 90, which provides a crank angle for which autoignition is likely for a given set of target charge properties based upon empirically gathered data.

The controller 30 is configured to determine whether autoignition is predicted to occur before a start of combustion limit (block 222), which corresponds to $\theta_{SOC}$. In one example embodiment, the start of combustion limit corresponds to +/-10° of TDC of the piston compression stroke. If autoignition is predicted (block 224), fuel is delivered to the combustion chamber 18. The parameters associated with a successfully predicted autoignition are stored (block 226) and the algorithms updated for subsequent cold starts. If the knock integral does not reach 1 by the end of the integration window, a misfire is predicted.

The processing speed of the controller 30 is sufficiently fast such that if a misfire is predicted for an engine cycle, at least several more predicting iterations (block 228 to block 220) are possible to search for a $\theta_{initial}$ where fueling can begin and yield a start of combustion prior to the start of combustion limit. Since the piston position necessarily will have changed since the last predictive iteration, new fuel mass and timing is selected for the in-cylinder conditions. The controller 30 is configured to predict another autoignition for the engine cycle (block 218) if autoignition is not predicted to occur before the start of combustion limit and sufficient time remains before a next engine cycle (block 228).

If a misfire is still predicted after reaching the allowable number of predictive iterations for a given engine cycle, then the fuel is disabled for that engine cycle (block 230). The piston will have moved sufficiently so that a fueling event is no longer possible for that engine cycle, but autoignition will be predicted for new in-cylinder conditions for the next engine cycle (block 232 to block 210). Though it may seem counter intuitive to skip providing fuel to a cylinder during an engine cold start event, fueling a cylinder that does not ultimately combust only results in excessive hydrocarbon emissions and unnecessary cylinder cooling, while providing no useful work. Furthermore, on engines which utilize rebreathe, the unburned hydrocarbons in the exhaust may be re-ingested into the combustion chamber of other cylinders, resulting in erratic combustion and emissions.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:
1. An engine control system comprising:
   a combustion chamber configured to provide an in-cylinder combustion condition;

a component configured to contribute to a combustion event in the combustion chamber;

at least one sensor configured to detect the in-cylinder combustion condition; and a controller in communication with the sensor and configured to predict a misfire in the combustion chamber in response to the detected in-cylinder combustion condition, the controller in communication with the component and configured to command the component to skip the contribution to the combustion event in response to the predicted misfire;

wherein the component is a fuel injector that is in fluid communication with the combustion chamber, the fuel injector configured to deliver fuel to the combustion chamber to contribute to the combustion event when autoignition is probable, the controller configured to prevent the fuel injector from delivering the fuel in response to the predicted misfire, wherein the misfire is probable when autoignition is improbable.

2. The engine control system according to claim 1, wherein the in-cylinder combustion condition is based upon a charge property that includes at least one of a combustion chamber pressure, a combustion chamber temperature and a combustion chamber oxygen content as a proxy for inert exhaust gas mass fraction, at least one sensor configured to detect a parameter associated with the at least one of the combustion chamber pressure, the combustion chamber temperature and the combustion chamber oxygen content.

3. The engine control system according to claim 1, wherein the charge property is used to predict an autoignition for an engine cycle.

4. The engine control system according to claim 3, wherein an engine cycle corresponds to a piston during a compression stroke.

5. The engine control system according to claim 1, wherein the controller selects a desired fuel mass and timing for a target crank angle to predict autoignition for the engine cycle.

6. The engine control system according to claim 5, wherein a knock integral is used to predict autoignition for the engine cycle.

7. The engine control system according to claim 6, wherein the controller is configured to determine whether autoignition is predicted to occur before a start of combustion limit.

8. The engine control system according to claim 7, wherein the start of combustion limit corresponds to +/−10° of top dead center of a piston compression stroke.

9. The engine control system according to claim 6, wherein predicted autoignition corresponds to a knock integral equal to 1.

10. The engine control system according to claim 8, wherein the controller is configured to predict another autoignition for the engine cycle if autoignition is not predicted to occur before the start of combustion limit and sufficient time remains before a next engine cycle.

11. The engine control system according to claim 5, wherein the desired fuel mass and timing is stored in a memory along with the corresponding in-cylinder conditions when autoignition is predicted.

12. A method of controlling an internal combustion engine comprising the steps of:

predicting a misfire in a combustion chamber; and skipping an initiation of a combustion event in the combustion chamber until the misfire is no longer predicted;

wherein the predicting step includes selecting a desired fuel mass and timing for the combustion event based upon in-cylinder conditions; and wherein the predicting step includes predicting autoignition of fuel within the combustion chamber.

13. The method according to claim 12, wherein the predicting step includes determining a knock integral based upon a crank angle and fuel ignition delay during an engine cycle.

14. The method according to claim 12, wherein the predicting step occurs multiple times for an engine cycle.

15. The method according to claim 12, wherein the predicting step is performed during an engine cold start.

16. An internal combustion engine control system comprising:

a controller configured to predict a misfire in a combustion chamber and disable a fuel flow to the combustion chamber in response to the predicted misfire;

wherein the controller is configured to determine the misfire based upon a knock integral.

17. The internal combustion engine control system according to claim 16, wherein the controller calculates the knock integral for a given engine cycle based upon pressure, temperature, and oxygen concentration within the combustion chamber, and a crank angle, engine speed and fuel ignition delay.

* * * * *